US011738823B2

(12) United States Patent
Chamberlain et al.

(10) Patent No.: US 11,738,823 B2
(45) Date of Patent: Aug. 29, 2023

(54) BICYCLE REAR SUSPENSION

(71) Applicant: SPECIALIZED BICYCLE COMPONENTS, INC., Morgan Hill, CA (US)

(72) Inventors: Jason Loy Chamberlain, Morgan Hill, CA (US); Brian Daniel Robinson, Morgan Hill, CA (US); Etienne Warnery, Morgan Hill, CA (US); Jeffrey Keith Bowers, San Jose, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 453 days.

(21) Appl. No.: 17/099,543

(22) Filed: Nov. 16, 2020

(65) Prior Publication Data
US 2021/0070391 A1 Mar. 11, 2021

Related U.S. Application Data

(63) Continuation of application No. 16/368,542, filed on Mar. 28, 2019, now Pat. No. 10,850,798, which is a
(Continued)

(51) Int. Cl.
*B62K 25/26* (2006.01)
*B62K 3/02* (2006.01)

(52) U.S. Cl.
CPC ............... *B62K 25/26* (2013.01); *B62K 3/02* (2013.01); *B62K 2201/08* (2013.01)

(58) Field of Classification Search
CPC ...... B62K 25/26; B62K 3/02; B62K 2201/08; B62K 25/10; B62K 2025/045; B62K 19/18; B62K 25/30
See application file for complete search history.

(56) References Cited

U.S. PATENT DOCUMENTS 5,611,557 A * 3/1997 Farris ................... B62K 25/286
280/275
5,725,227 A 3/1998 Mayer
(Continued)

FOREIGN PATENT DOCUMENTS

| CN | 2934048 Y | 8/2007 |
| DE | 102010009649 | 9/2011 |
| JP | 2008/201364 A | 9/2008 |

OTHER PUBLICATIONS

Photographs of Sender bicycle by Canyon Bicycles USA, Inc. A printout of a webpage in which the Sender bicycle was reviewed is also included. The printout indicates that the webpage was first published on Apr. 5, 2016; however, Applicant makes no representations as to the accuracy of this date or if the product has changed since that date. The printout was retrieved from bikeradar.com on Jun. 4, 2018. Applicant requests that the Examiner review the reference as prior art. Applicant reserves the right to disqualify the reference as prior art if needed.

*Primary Examiner* — Kevin Hurley
*Assistant Examiner* — Harold Eric Pahlck, III
(74) *Attorney, Agent, or Firm* — KNOBBE, MARTENS, OLSON & BEAR, LLP

(57) ABSTRACT

A bicycle comprises a front wheel; a rear wheel; a frame comprising a main frame portion and an articulating frame portion, the articulating frame portion comprising: a lower arm pivotally supported at a first axis by the main frame portion; an upper frame link pivotally supported at a second axis by the main frame portion; an upper arm pivotally coupled to the upper frame link at a third axis; an upper shock link pivotally coupled to the upper frame link and the upper arm at the third axis; and a lower shock link pivotally coupled to the main frame portion and the lower arm at the first axis; and a shock absorber having a first end pivotally supported at a fourth axis by the main frame portion, and a
(Continued)

second end pivotally supported at a fifth axis by the upper shock link and the lower shock link.

11 Claims, 10 Drawing Sheets

Related U.S. Application Data continuation-in-part of application No. 15/941,686, filed on Mar. 30, 2018, now Pat. No. 10,850,796.

(56) References Cited

U.S. PATENT DOCUMENTS

| | | | |
|---|---|---|---|
| 6,161,858 A | 12/2000 | Tseng | |
| 6,244,610 B1 | 6/2001 | Kramer-Massow | |
| 6,712,374 B2 | 3/2004 | Assier | |
| 6,843,494 B2 * | 1/2005 | Lam | B62K 25/286 |
| | | | 280/284 |
| 6,877,591 B1 | 4/2005 | Hso | |
| 6,880,847 B2 | 4/2005 | Chamberlain et al. | |
| 6,955,373 B2 | 10/2005 | Chang | |
| 7,350,797 B2 | 4/2008 | Carroll | |
| 7,395,892 B2 | 7/2008 | Alonzo | |
| 7,661,503 B2 | 2/2010 | Weagle | |
| 7,815,207 B2 * | 10/2010 | Currie | B62K 25/286 |
| | | | 280/285 |
| 8,006,993 B1 | 8/2011 | Chamberlain | |
| 8,066,089 B2 | 11/2011 | Murad | |
| 8,286,982 B2 | 10/2012 | Plantet et al. | |
| 8,590,914 B2 * | 11/2013 | Domahidy | B62K 25/286 |
| | | | 280/284 |
| 8,622,411 B1 * | 1/2014 | Chamberlain | B62K 25/286 |
| | | | 280/281.1 |
| 8,919,799 B2 | 12/2014 | Wimmer | |
| 9,056,647 B2 * | 6/2015 | Hu | B62K 25/04 |
| 9,061,729 B2 * | 6/2015 | Canfield | B62K 25/26 |
| 9,145,185 B1 | 9/2015 | Claro | |
| 9,242,693 B2 | 1/2016 | Voss | |
| 9,598,140 B2 * | 3/2017 | Berthold | B62K 25/286 |
| 2005/0046142 A1 | 3/2005 | Chamberlain | |
| 2005/0184483 A1 | 8/2005 | Buckley | |
| 2010/0109282 A1 | 5/2010 | Weagle | |
| 2011/0140387 A1 | 6/2011 | Andal et al. | |
| 2012/0228850 A1 | 9/2012 | Tseng | |
| 2014/0060950 A1 | 3/2014 | Beutner | |
| 2017/0151996 A1 | 6/2017 | Southall | |

* cited by examiner

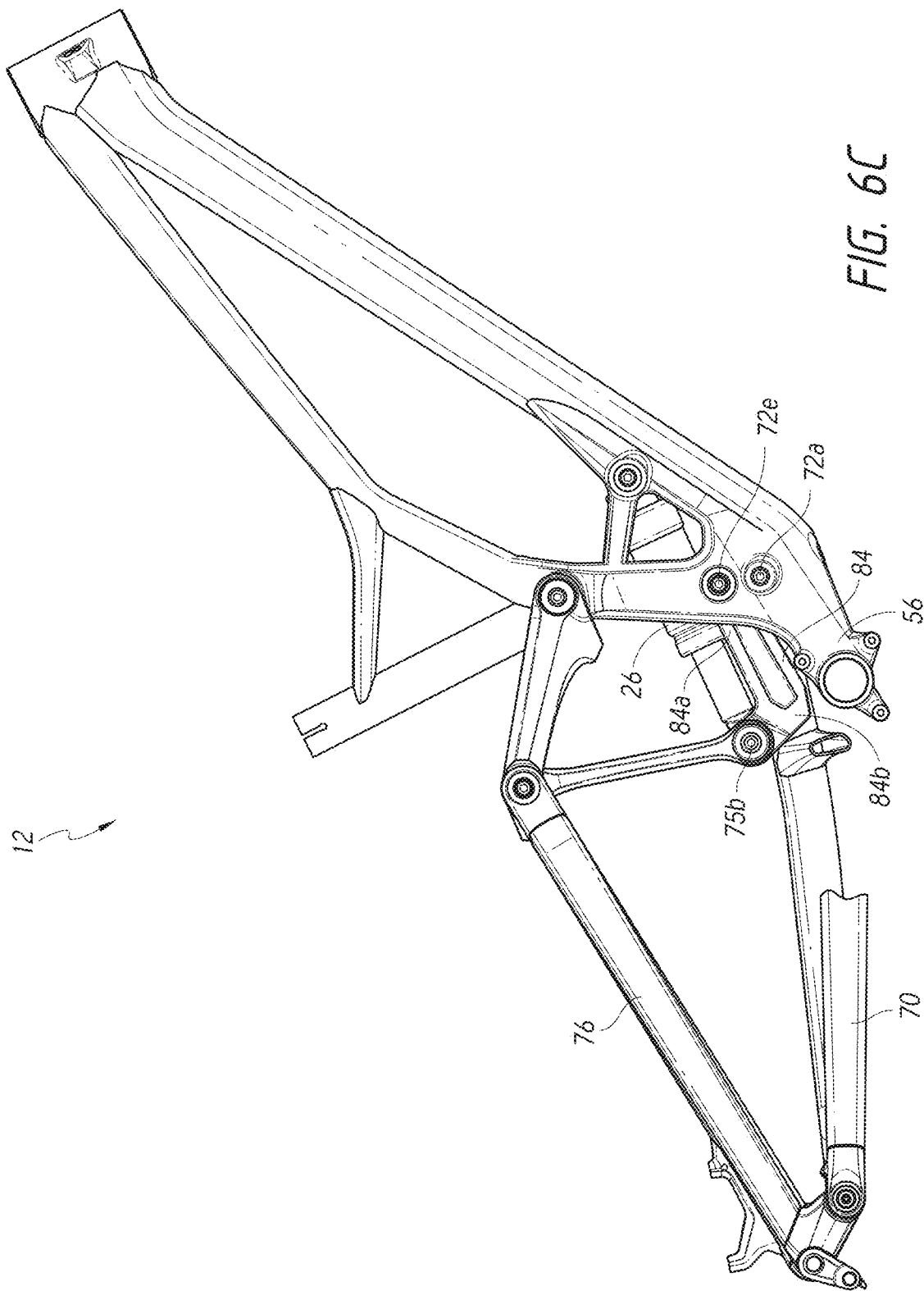

BICYCLE REAR SUSPENSION

CROSS REFERENCE TO RELATED APPLICATIONS

This application is a continuation of U.S. patent application Ser. No. 16/368,542, filed Mar. 28, 2019, which is a continuation-in-part of U.S. patent application Ser. No. 15/941,686, filed Mar. 30, 2018. Each of the foregoing applications is hereby incorporated by reference herein in its entirety.

TECHNICAL FIELD

The present technology relates generally to vehicle suspension systems. More particularly, the present technology relates to a rear wheel suspension assembly suitable for use in connection with off-road bicycles.

DESCRIPTION OF THE RELATED TECHNOLOGY

Off-road bicycles, or mountain bikes, may be equipped with front and rear suspension assemblies operably positioned between the front and rear wheels, respectively, and the frame of the bicycle. Providing front and rear suspension on a mountain bike potentially improves handling and performance by absorbing bumps, and other rough trail conditions, which may be encountered while riding off-road. As the sport of mountain biking has evolved, the size and difficulty of the obstacles that have become commonplace has increased in scale. As a result, bicycle manufacturers have attempted to continually increase the amount of suspension travel and/or performance of the suspension systems to accommodate more aggressive riding. Such designs can present a variety of problems, however, such as increased weight and/or less desirable performance near the end of the suspension travel.

One common bicycle rear suspension design involves a single lever, or swingarm, supporting a rear wheel at one end and being pivotally connected to the bicycle frame at the other end. Although such a system is simple and reliable, the single lever, or single pivot, rear suspension design suffers from a relatively large amount of pedal forces and braking forces being transmitted into the rear suspension assembly.

Rear suspension designs that include multiple lever members and, therefore, multiple pivots, typically exhibit better isolation of pedaling forces and braking forces from the rear suspension. Typically, a multiple lever rear suspension assembly will have a pair of lower arms (i.e., chain stays) pivotally connected to the bicycle frame at a forward end and a link member pivotally mounted to the main frame at a location above the chain stays. A pair of rearward arms (i.e., seat stays) are pivotally connected between rearward ends of the chain stays and link member. The rear wheel may be carried by either of the chain stays or seat stays. Typically, the rear shock absorber is operably positioned between the link member and the main frame. As a result, placement of the shock absorber is at a relatively high position within the bicycle frame, thereby raising the overall center of gravity of the bicycle, which is detrimental to the handling qualities of the bicycle. This drawback is magnified in large suspension travel designs, wherein the size of the rear shock absorber is typically increased. Another potential drawback of large suspension travel designs is that the rear wheel will tend to travel along a forward arc-shaped path as the suspension is compressed, with the forward arc being more pronounced near the end of the stroke.

SUMMARY

The systems, methods, and devices described herein have innovative aspects, no single one of which is indispensable or solely responsible for their desirable attributes. Without limiting the scope of the claims, some of the advantageous features will now be summarized.

The present disclosure describes bicycles having rear bicycle suspension systems that address one or more of the deficiencies described above and that provide one or more of a variety of benefits over previous rear suspension systems, such as a rear axle that can follow a more vertical path, especially near the end of stroke, lower weight, easier manufacturability, a lower center of gravity that can help to improve handling, and a more progressive shock leverage ratio, such as to avoid harsh bottoming out of the suspension.

According to some embodiments, a bicycle comprises: a front wheel; a rear wheel; a frame comprising a main frame portion and an articulating frame portion, said articulating frame portion carrying said rear wheel, said articulating frame portion having a relaxed configuration and a compressed configuration; the articulating frame portion comprising: a lower arm pivotally supported at a first axis by the main frame portion; an upper frame link pivotally supported at a second axis by the main frame portion; an upper arm pivotally coupled to the upper frame link at a third axis; an upper shock link pivotally coupled to the upper frame link and the upper arm at the third axis; and a lower shock link pivotally coupled to the main frame portion and the lower arm at the first axis; and a shock absorber having a first end and a second end, the first end pivotally supported at a fourth axis by the main frame portion, the second end pivotally supported at a fifth axis by the upper shock link and the lower shock link, the shock absorber configured to bias the articulating frame portion to the relaxed configuration.

In some embodiments, the fourth axis is collinear with the second axis. In some embodiments, the upper and lower shock links are positioned such that the first axis, third axis, and fifth axis are never coplanar throughout a range of motion of the articulating frame portion from the relaxed configuration to the compressed configuration. In some embodiments, the fourth axis is positioned above the fifth axis such that a longitudinal axis of the shock absorber slopes downward from the first end to the second end in all positions between the compressed configuration and the relaxed configuration. In some embodiments, the fourth axis and the fifth axis are both positioned below the second axis throughout a range of motion of the articulating frame portion from the relaxed configuration to the compressed configuration.

According to some embodiments, a bicycle comprises: a front wheel; a rear wheel; a frame comprising a main frame portion and an articulating frame portion, said articulating frame portion carrying said rear wheel, said articulating frame portion having a relaxed configuration and a compressed configuration; the articulating frame portion comprising: a lower arm pivotally supported at a first axis by the main frame portion; an upper frame link pivotally supported at a second axis by the main frame portion; an upper arm pivotally coupled to the upper frame link and the lower arm; an upper shock link pivotally supported at a third axis by one or both of the upper frame link and the upper arm; and a lower shock link pivotally coupled to the main frame portion; a shock absorber having a first end and a second end, the first end pivotally supported at a fourth axis by the main frame portion, the second end pivotally supported at a fifth axis by the upper shock link and the lower shock link, the shock absorber configured to bias the articulating frame portion to the relaxed configuration; and a pedal crank rotatably coupled to the main frame portion at sixth axis, the first axis being forward of the sixth axis; wherein, when the bicycle is positioned on a horizontal surface with the articulating frame portion in the relaxed configuration, a horizontal distance from the sixth axis to the first axis is at least 1.5 inches.

In some embodiments, when the bicycle is positioned on a horizontal surface with the articulating frame portion in the relaxed configuration, the horizontal distance from the sixth axis to the first axis is at least 3 inches. In some embodiments, when the bicycle is positioned on a horizontal surface with the articulating frame portion in the relaxed configuration, a horizontal distance from a rotational axis of the rear wheel to the first axis is no greater than 10 times the horizontal distance from the sixth axis to the first axis. In some embodiments, when the bicycle is positioned on a horizontal surface with the articulating frame portion in the relaxed configuration, a horizontal distance from a rotational axis of the rear wheel to the first axis is no greater than 7 times the horizontal distance from the sixth axis to the first axis. In some embodiments, when the articulating frame portion is in the relaxed configuration, a horizontal distance from a rotational axis of the rear wheel to the first axis is at least 18 inches. In some embodiments, when the articulating frame portion is in the relaxed configuration, a horizontal distance from the rotational axis of the rear wheel to the first axis is at least 20 inches.

According to some embodiments, a bicycle comprises: a front wheel; a rear wheel; a frame comprising a main frame portion and an articulating frame portion, said articulating frame portion carrying said rear wheel, said articulating frame portion having a relaxed configuration and a compressed configuration; the articulating frame portion comprising: a lower arm pivotally supported at a first axis by the main frame portion; an upper frame link pivotally supported at a second axis by the main frame portion; an upper arm pivotally coupled to the upper frame link and the lower arm; an upper shock link pivotally supported at a third axis by one or both of the upper frame link and the upper arm; and a lower shock link pivotally coupled to the main frame portion; and a shock absorber having a first end and a second end, the first end pivotally supported at a fourth axis by the main frame portion, the second end pivotally supported at a fifth axis by the upper shock link and the lower shock link, the shock absorber configured to bias the articulating frame portion to the relaxed configuration; wherein the first axis is positioned forward of the second axis when the bicycle is positioned on a horizontal surface with the articulating frame portion in the relaxed configuration.

In some embodiments, the first axis is positioned at least 0.50 inches forward of the second axis when the bicycle is positioned on a horizontal surface with the articulating frame portion in the relaxed configuration. In some embodiments, the upper shock link is pivotally supported at the third axis by both of the upper frame link and the upper arm. In some embodiments, the rear wheel is rotatably coupled to the upper arm. In some embodiments, the lower shock link is pivotally coupled to the main frame portion at a sixth axis, and the upper and lower shock links are positioned such that the third axis, fifth axis, and sixth axis are never coplanar throughout a range of motion of the articulating frame portion from the relaxed configuration to the compressed configuration. In some embodiments, the sixth axis is collinear with the first axis. In some embodiments, the second axis is collinear with the fourth axis. In some embodiments, the fourth axis is positioned above the fifth axis such that a longitudinal axis of the shock absorber slopes downward from the first end to the second end in all positions between the compressed configuration and the relaxed configuration. In some embodiments, the fourth axis is positioned below the second axis. In some embodiments, the fourth axis and the fifth axis are both positioned below the second axis throughout a range of motion of the articulating frame portion from the relaxed configuration to the compressed configuration. In some embodiments, the second end of the shock absorber comprises a shock extension pivotally supported at the fifth axis by the upper shock link and the lower shock link.

According to some embodiments, a bicycle comprises: a front wheel; a rear wheel; a frame comprising a main frame portion and an articulating frame portion, said articulating frame portion carrying said rear wheel, said articulating frame portion having a relaxed configuration and a compressed configuration; the articulating frame portion comprising: a lower arm pivotally supported at a first axis by the main frame portion; an upper frame link pivotally supported at a second axis by the main frame portion; an upper arm pivotally coupled to the upper frame link and the lower arm; an upper shock link pivotally supported at a third axis by one or both of the upper frame link and the upper arm; and a lower shock link pivotally coupled to the main frame portion at a fourth axis; and a shock absorber having a first end and a second end, the first end pivotally supported at a fifth axis by the main frame portion, the second end pivotally supported at a sixth axis by the upper shock link and the lower shock link, the shock absorber configured to bias the articulating frame portion to the relaxed configuration, wherein, when the bicycle is positioned on a horizontal surface with the articulating frame portion in the relaxed configuration, the fourth axis is positioned forward of the second axis.

In some embodiments, the main frame portion comprises a top tube and a down tube, and the first end of the shock absorber is pivotally supported at the fifth axis by the down tube of the main frame portion. In some embodiments, the down tube comprises a bracket extending rearward of a main body of the down tube, and wherein the first end of the shock absorber is pivotally supported at the fifth axis by the bracket. In some embodiments, the upper shock link is pivotally supported at the third axis by both of the upper frame link and the upper arm.

According to some embodiments, A bicycle comprises: a front wheel; a rear wheel; a frame comprising a main frame portion and an articulating frame portion, said articulating frame portion carrying said rear wheel, said articulating frame portion having a relaxed configuration and a compressed configuration; the main frame portion comprising a motor housing that positions an electric motor adjacent a crank axis; the articulating frame portion comprising: a lower arm pivotally supported at a first axis by the main frame portion; an upper frame link pivotally supported at a second axis by the main frame portion; an upper arm pivotally coupled to the upper frame link and the lower arm; an upper shock link pivotally supported at a third axis by one or both of the upper frame link and the upper arm; and a lower shock link pivotally coupled to the main frame portion at a fourth axis; and a shock absorber having a first end and a second end, the first end pivotally supported at a fifth axis by the main frame portion, the second end pivotally supported at a sixth axis by one or both of the upper shock link and the lower shock link, the shock absorber configured to bias the articulating frame portion to the relaxed configuration, wherein, when the bicycle is positioned on a horizontal surface with the articulating frame portion in the relaxed configuration, the fourth axis is positioned forward of the second axis, and the second axis is positioned forward of the first axis.

In some embodiments, when the bicycle is positioned on a horizontal surface with the articulating frame portion in the relaxed configuration, the fourth axis is positioned above the motor housing. In some embodiments, when the bicycle is positioned on a horizontal surface with the articulating frame portion in the relaxed configuration, the first axis is positioned above the motor housing. In some embodiments, when the bicycle is positioned on a horizontal surface with the articulating frame portion in the relaxed configuration, the crank axis is positioned rearward of the fourth axis. In some embodiments, when the bicycle is positioned on a horizontal surface with the articulating frame portion in the relaxed configuration, the crank axis is positioned rearward of the second axis. In some embodiments, when the bicycle is positioned on a horizontal surface with the articulating frame portion in the relaxed configuration, the crank axis is positioned forward of the first axis. In some embodiments, the main frame portion comprises a bottom bracket support member, a seat tube, and a seat tube support member extending between the seat tube and the bottom bracket support member, and wherein the lower shock link is pivotally coupled to the bottom bracket support member at the fourth axis. In some embodiments, when the bicycle is positioned on a horizontal surface with the articulating frame portion in the relaxed configuration, the fourth axis is positioned forward of the seat tube support member. In some embodiments, the second end of the shock absorber is pivotally supported at the sixth axis by both of the upper shock link and the lower shock link. In some embodiments, the main frame portion comprises a top tube and a down tube, and the first end of the shock absorber is pivotally supported at the fifth axis by the down tube of the main frame portion. In some embodiments, the down tube comprises a bracket extending rearward of a main body of the down tube, and wherein the first end of the shock absorber is pivotally supported at the fifth axis by the bracket. In some embodiments, when the bicycle is positioned on a horizontal surface with the articulating frame portion in the relaxed configuration, a horizontal distance between the first axis and the second axis is greater than a horizontal distance between the second axis and the fourth axis. In some embodiments, when the bicycle is positioned on a horizontal surface with the articulating frame portion in the relaxed configuration, a horizontal distance between the first axis and the second axis is at least two times greater than a horizontal distance between the second axis and the fourth axis. In some embodiments, when the bicycle is positioned on a horizontal surface with the articulating frame portion in the relaxed configuration, a horizontal distance between the first axis and the second axis is at least 2.5 times greater than a horizontal distance between the second axis and the fourth axis. In some embodiments, when the bicycle is positioned on a horizontal surface with the articulating frame portion in the relaxed configuration, the fourth axis is positioned above the first axis. In some embodiments, the upper shock link is pivotally supported at the third axis by both of the upper frame link and the upper arm. In some embodiments, the crank axis is surrounded by the motor housing. In some embodiments, the bicycle further comprises a pedal crank assembly configured to enable a rider to apply an input torque at the crank axis.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting.

FIGS. 6A-6D are side elevational views of alternative embodiments of bicycle frames.

DETAILED DESCRIPTION

Figure 1:
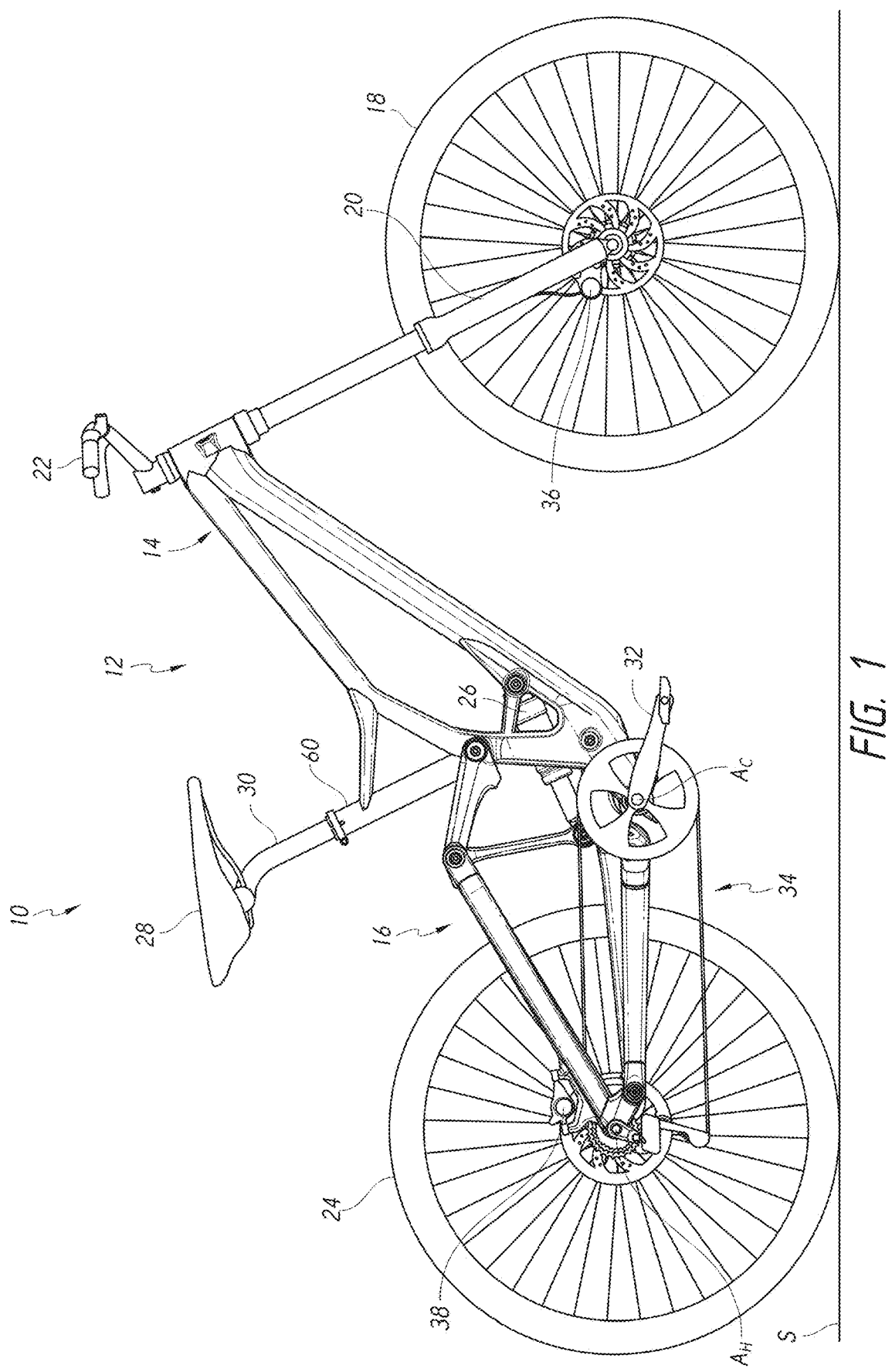
FIG. 1 is a side elevational view of an off-road bicycle, or mountain bike, incorporating a bicycle frame having certain features, aspects and advantages of the present technology.

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and form part of this disclosure. For example, a system or device may be implemented or a method may be practiced using any number of the aspects set forth herein. In addition, such a system or device may be implemented or such a method may be practiced using other structure, functionality, or structure and functionality in addition to or other than one or more of the aspects set forth herein. Alterations and further modifications of the inventive features illustrated herein, and additional applications of the principles of the inventions as illustrated herein, which would occur to one skilled in the relevant art and having possession of this disclosure, are to be considered within the scope of the invention. Descriptions of unnecessary parts or elements may be omitted for clarity and conciseness, and like reference numerals refer to like elements throughout.

The disclosure herein presents embodiments of improved bicycle rear suspension systems having various benefits over prior art designs. The embodiments described below may include one or more of the following benefits, among others: a rear axle path that follows more of a vertical path instead of a forward arc, allowing for better absorption of bumps; a lower center of gravity, to enable better handling of the bicycle; a more progressive leverage ratio, to avoid harsh bottoming out of the suspension system; reduced weight; and increased manufacturability and/or reduced manufacturing costs.

FIG. 1 illustrates one embodiment of an off-road bicycle, or mountain bike 10, including a preferred rear suspension assembly. The bicycle 10 is described herein with reference to a coordinate system wherein a longitudinal axis extends from a forward end to a rearward end of the bicycle 10. A vertical, central plane generally bisects the bicycle 10 and contains the longitudinal axis. A lateral axis extends normal to the longitudinal axis and lies within a horizontal plane. In addition, relative heights are generally expressed as elevations from a horizontal surface S upon which the bicycle 10 is supported in an upright position. Similarly, relative forward and rearward positions are expressed as distances from a vertical axis, which is normal to the horizontal surface S. The above-described coordinate system is provided for the convenience of describing the embodiment illustrated in the figures, and is not intended to limit the scope of the present disclosure unless expressly indicated.

The bicycle 10 includes a frame assembly 12 comprised of a main frame 14 and an articulating frame, or subframe 16, pivotally supported relative to the main frame 14. The bicycle 10 also includes a front wheel 18 carried by a front suspension assembly, or suspension fork 20. A steerer tube (not shown) is journaled for rotation about a steering axis $A_S$ defined by the main frame 14 (shown in FIG. 2). A handlebar assembly 22 is connected to an upper end of the suspension fork 20 and is operable to permit a rider of the bicycle 10 to rotate the front wheel 18 about the steering axis $A_S$.

Figure 2:
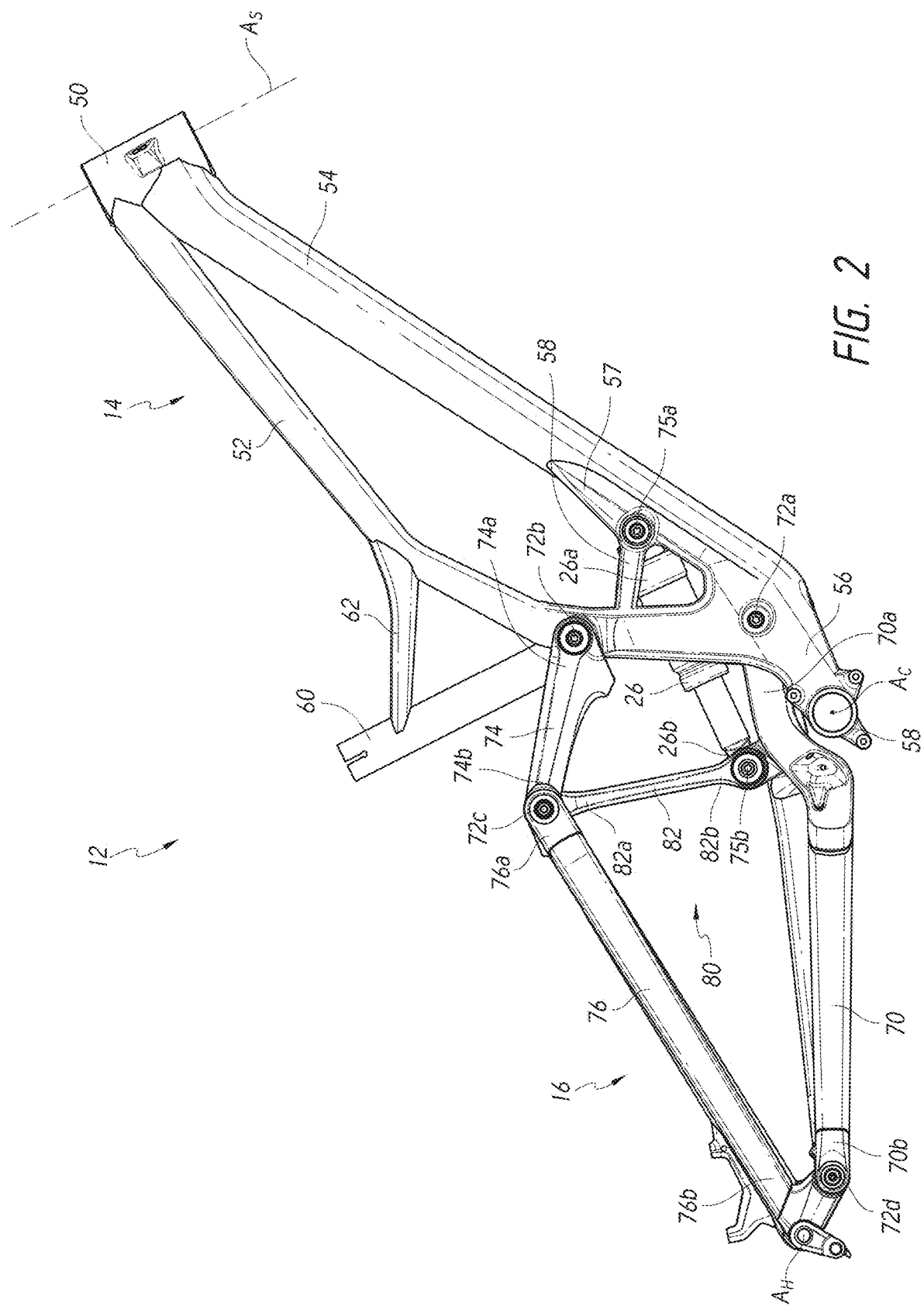
FIG. 2 is a side elevational view of the bicycle frame of FIG. 1 with certain components of the bicycle removed for the purpose of clarity.

A rear wheel 24 of the bicycle 10 is carried by the subframe 16. A shock absorber 26 is pivotally connected to both the main frame 14 and the subframe 16 to provide resistance to articulating motion of the subframe 16 relative to the main frame 14 and, thus, provide resistance to the suspension travel of the rear wheel 24. The shock absorber 26 preferably biases the subframe 16 to the relaxed configuration, as shown in FIG. 2. Returning to FIG. 1, a seat assembly 28 is supported above the bicycle frame 12 at a position behind the handlebar assembly 22 and provides support for a rider of the bicycle 10.

A pedal crank assembly 32 is rotatably supported by the bicycle frame 12 and drives a multi-speed chain drive arrangement 34. The bicycle 10 also includes front and rear brake systems 36, 38 for slowing and stopping the bicycle 10. Although the illustrated brakes 36, 38 are disc-type brakes, other suitable brake systems may also be used, such as rim-type brakes for example. Rider controls (not shown) are typically provided on the handlebar assembly 22 and are operable to control shifting of the multi-speed chain drive arrangement 34 and front and rear brake systems 36, 38.

Figure 3:
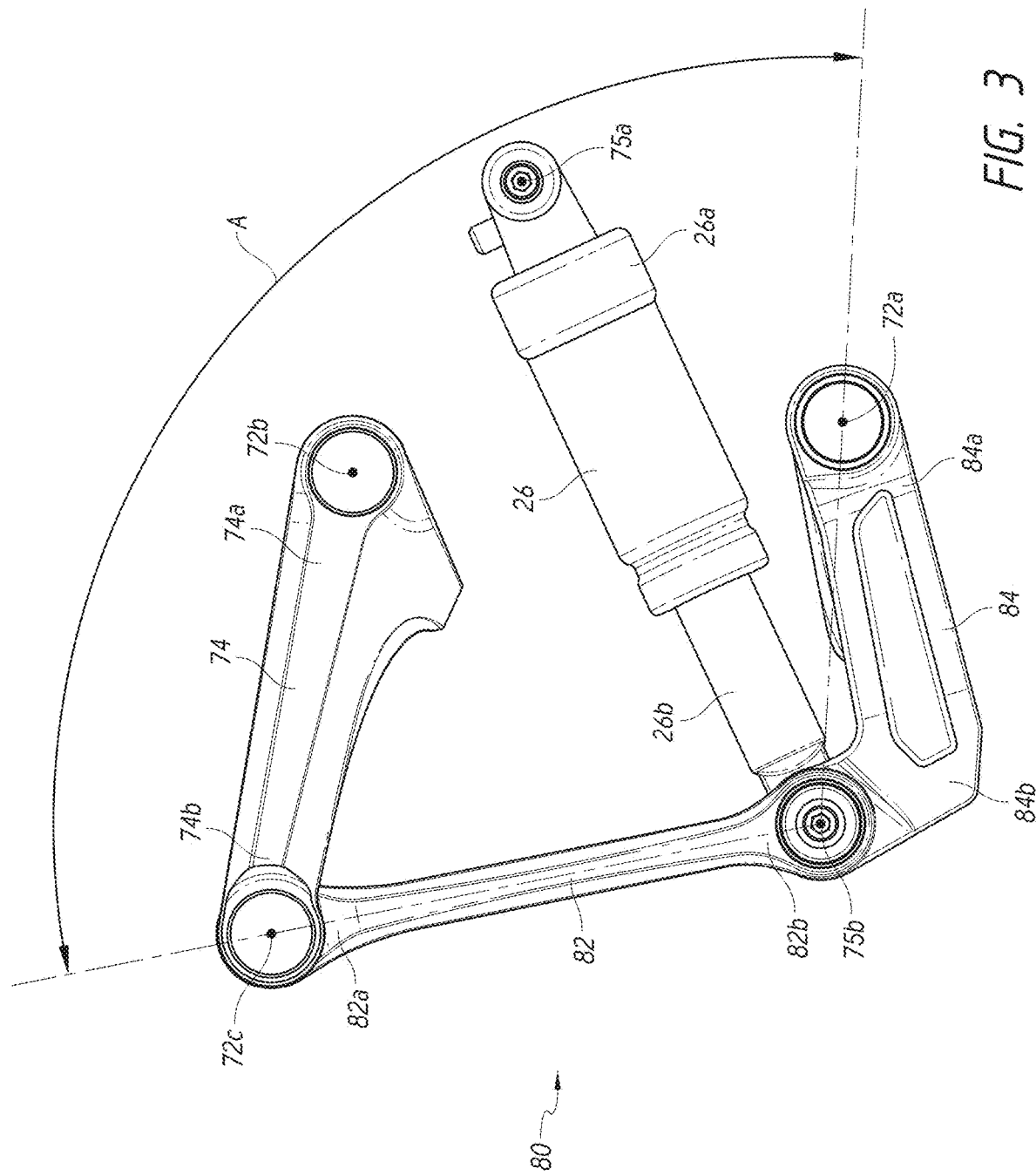
FIG. 3 is a side elevational view of the bicycle frame of FIG. 2 with additional components removed for the purpose of clarity.
Figure 4:
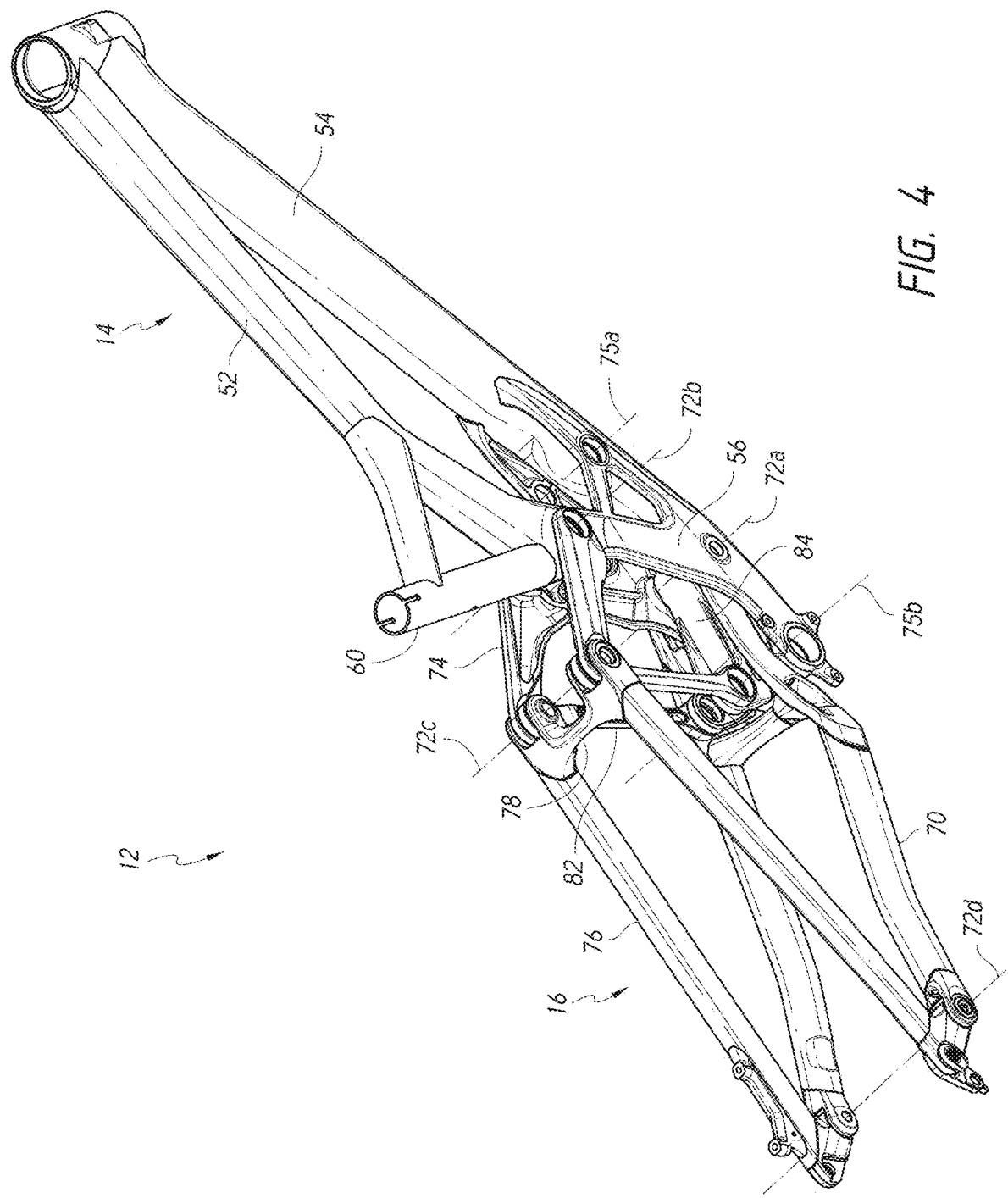
FIG. 4 is a perspective view showing the top, right, and rear sides of the bicycle frame of FIG. 2.
Figure 5:
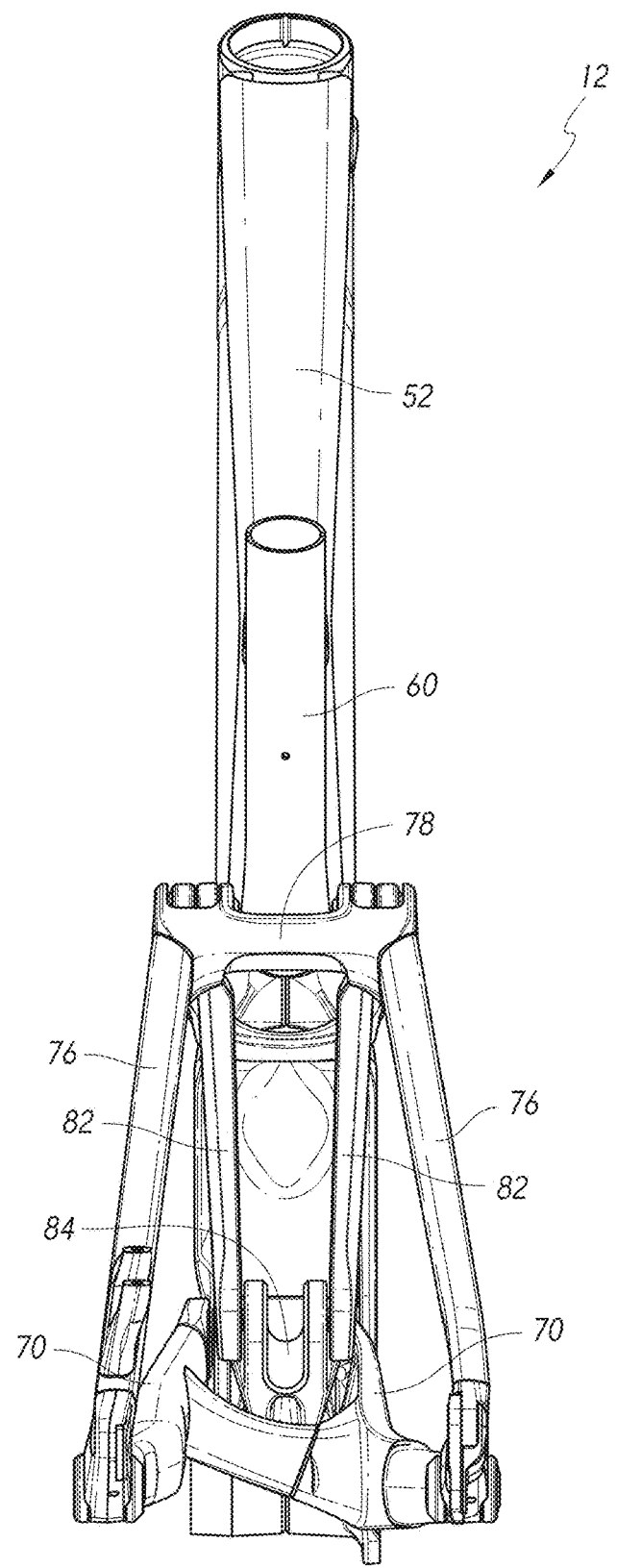
FIG. 5 is a rear elevational view of the bicycle frame of FIG. 2.

FIG. 2 illustrates the bicycle frame 12 and rear shock absorber 26 with the remaining components of the bicycle 10 removed for clarity. FIG. 3 illustrates the rear shock absorber 26 and a portion of the bicycle frame 12 (a shock support assembly 80 and a lever arm 74), with the remaining components of the bicycle frame 12 removed for clarity. FIGS. 4 and 5 illustrate additional views of the bicycle frame 12, with the rear shock absorber 26 also removed for clarity. As described above, preferably, the bicycle frame 12 is primarily comprised of a main frame 14 and an articulating frame, or subframe 16. The main frame 14 includes a head tube 50 which defines the steering axis $A_S$ of the bicycle frame 12. Desirably, the steering axis $A_S$ is canted rearwardly from a vertical axis. The head tube 50 is configured to rotatably support the front suspension 20 and, thus, the front wheel 18 of the bicycle 10.

A top tube 52 and a down tube 54 extend in a rearward direction from the head tube 50 and diverge from one another when moving toward their rearward ends. A bottom bracket support member 56 extends between the rearward ends of the top tube 52 and the down tube 54 and together therewith defines a shape that may be generally triangular or may take other forms. The bottom bracket support member 56 includes a bottom bracket shell 58, which supports the pedal crank assembly 32 (shown in FIG. 1) for rotation about a crank axis $A_C$.

A seat tube 60 extends in an upward direction from a rearward end of the top tube 52 and, preferably, is canted rearwardly from a vertical axis. The seat tube 60 supports the seat assembly 28 shown in FIG. 1. Desirably, a gusset 62 extends from a forward side of the seat tube 60 to an upper side of the top tube 52 to provide additional strength to the seat tube 60.

Preferably, the main frame 14 is constructed of individual components, as described above, which are fabricated from a metal material, such as aluminum or steel, and welded together. Desirably, the bottom bracket support member 56 is created from a metal material by a forging process and, thus, benefits from the strength and durability advantages that inherently result from the forging process. Preferably, the articulating frame 16 is directly supported by the bottom bracket support member 56, as is described in greater detail below. Further, the shock absorber 26 is preferably supported by a bracket 57 attached to the down tube 54. In some embodiments, the bracket 57 may be connected to and/or be formed as a part of the bottom bracket support member 56. In some embodiments, at least a portion of the bracket 57 may be connected to the bottom bracket support member 56 by a gusset. For example, as shown in FIG. 2, a gusset 58 desirably extends from a forward side of the bottom bracket support member 56 to an upper or rearward side of the bracket 57.

However, in alternative embodiments, the main frame 14 may be constructed in a more conventional fashion wherein the forged bottom bracket support member 56, bracket 57, and/or gusset 58 are omitted and the articulating frame 16 and shock absorber 26 may be pivotally connected to the welded-up tubes comprising the main frame 14. Further, other suitable constructions of the main frame 14, including non-triangular constructions, may also be used, such as a monocoque construction, for example. In addition, alternative materials such as composites may also be used in whole or in part to construct the main frame 14, as will readily be appreciated by one of skill in the art. The illustrated embodiment is preferred, however, for at least the reasons discussed herein.

As described above, the illustrated bicycle frame 10 includes a shock absorber 26 operably positioned between the main frame 14 and the subframe 16. Desirably, the shock absorber 26 is configured to provide both a spring force and a damping force in response to relative movement between the subframe 16 and the main frame 14, as is known in the art. The spring force is related to the relative position between the subframe 16 and the main frame 14 while the damping force is related to the relative speed of movement between the subframe 16 and the main frame 14.

Although the illustrated shock absorber 26 comprises an air spring type shock absorber, other suitable suspension shock absorbers, such as those incorporating a coil type spring, for example, may also be used. Preferably, the damping system comprises a piston movable within a fluid cylinder of the shock absorber 26. Desirably, the piston forces hydraulic fluid within the fluid chamber through one or more restrictive flow paths to generate a damping force when the shock absorber 26 is both extending and compressing, as is known in the art. In addition, other types of damping arrangements, such as inertia activated and position sensitive arrangements, may also be used, as will be readily understood by one of skilled in the art.

As described above, the subframe 16 is configured to support the rear wheel 24 (as shown in FIG. 1) for a movement throughout a suspension travel path relative to the main frame 14 from a relaxed position, substantially as illustrated in FIG. 2, to a compressed position, wherein the subframe 16 is pivoted in an upward direction relative to the main frame 14. Preferably, the subframe 16 is a multiple linkage assembly. That is, preferably, the subframe 16 includes a plurality of linkage members pivotally interconnected with one another. However, in alternative arrangements, a single link member may carry the rear wheel 24 for movement in a simple, arcuate suspension travel path relative to the main frame 14.

In the illustrated arrangement, the subframe 16 includes a chain stay member 70 having a forward end 70a pivotally connected to the main frame 14 for rotation about a pivot axis 72a. Preferably, the chain stay member 70 includes a pair of laterally-spaced arms that extend in a rearward direction from the forward end 70a and straddle the rear wheel 24 (as shown in FIG. 1). However, in an alternative arrangement, the chain stay member 70 may comprise a single arm positioned on one side of the rear wheel 24. Desirably, the chain stay member 70 is connected directly to the main frame 14. However, alternatively, the chain stay member 70 may be connected to the main frame 14 indirectly, such as through an additional link member, for example.

A link member, or lever arm 74, is pivotally connected at a forward end 74a to the main frame 14 for a pivotal motion about a pivot axis 72b. Desirably, the pivot axis 72b is spaced above the pivot axis 72a and, preferably, is positioned proximate a junction between the seat tube 60 and the top tube 52. In the illustrated embodiment, the forward end 74a of the link member 74 includes a pair of arm portions straddling the seat tube 60.

A seat stay member 76 is pivotally supported at an upper end 76a by a rearward end 74b of the link member 74 for pivotal movement about a pivot axis 72c. A lower end 76b of the seat stay member 76 is pivotally supported at a pivot axis 72d defined by a rearward end 70b of the chain stay member 70. Preferably, the seat stay member 76 includes a pair of laterally-spaced arms straddling the rear wheel 24 (as shown in FIG. 1) and interconnected by a bridge 78 at the upper end 76a of the seat stay member 76.

Desirably, a first or front end 26a of the shock absorber 26 is pivotally connected to the main frame 14 and, more specifically, to the bracket 57 coupled to the down tube 54 for rotation about a pivot axis 75a. The bracket 57 may be connected to or formed as part of the bottom bracket support member 56, which may be desirable, for example, to increase rigidity between pivot axes 75a, 72a, and 72b. In some embodiments, however, the bracket 57 is not connected to or formed as a part of the bottom bracket support member 56. Further, a gusset 58 may desirably provide additional structural rigidity to the pivot axis 75a by connecting a portion of the bracket 57 adjacent the pivot axis 75a to an upper end of the bottom bracket support member 56. A second or rearward end 26b of the shock absorber is pivotally connected to a shock support assembly 80 at pivot axis 75b. The shock support assembly 80 preferably comprises an upper shock link 82 having a first end 82a and a second end 82b, and a lower shock link 84 having a first end 84a and a second end 84b. The second end 82b of the upper shock link 82 is preferably pivotally coupled to the second end 84b of the lower shock link 84 at pivot axis 75b. The first end 82a of the upper shock link 82 is preferably pivotally coupled to the link member 74 and seat stay or upper arm 76 at pivot axis 72c. The first end 84a of the lower shock link 84 is preferably pivotally coupled to the chain stay or lower arm 70 and the bottom bracket support member 56 at pivot axis 72a.

Figure 6A:
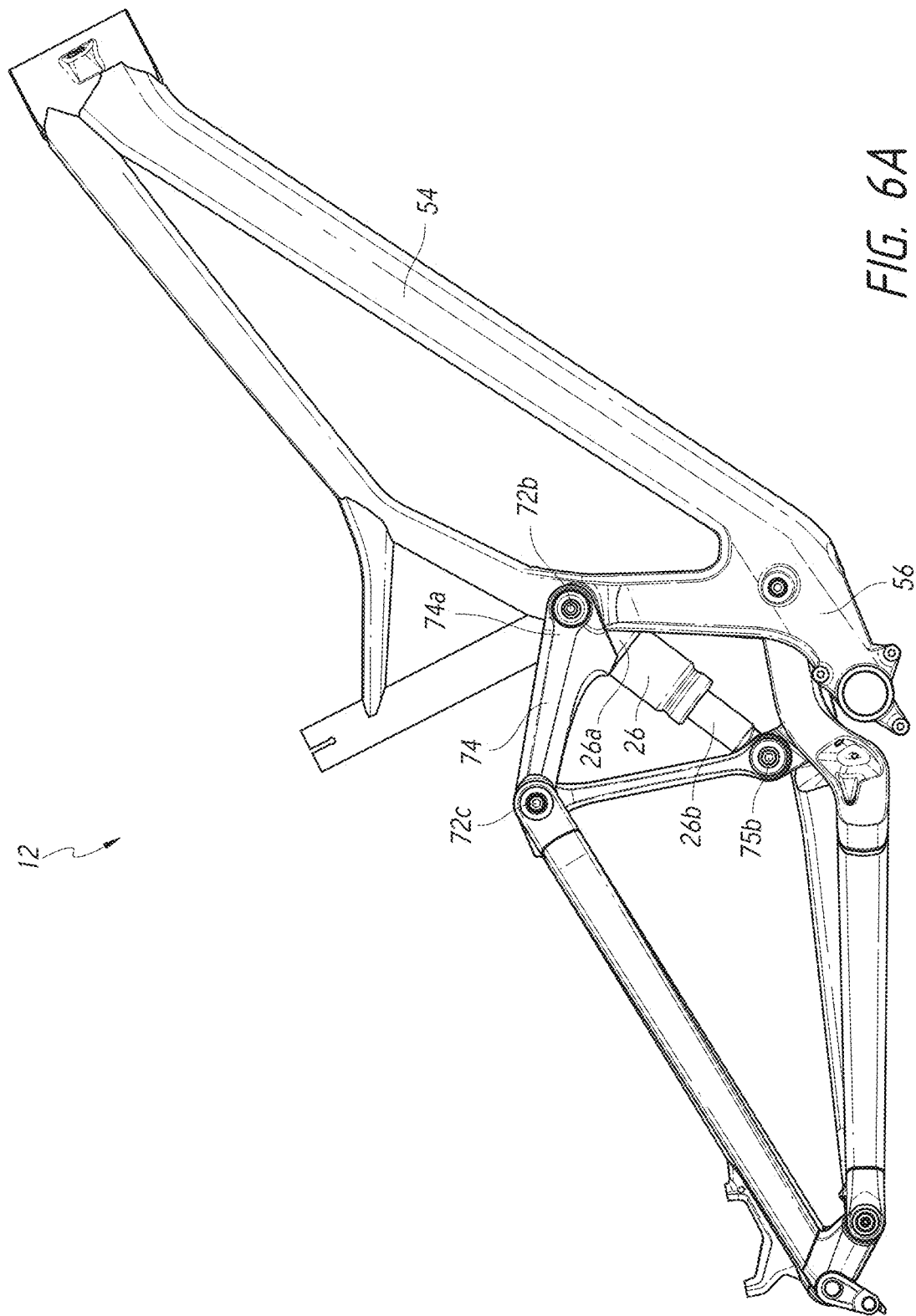
Figure 6B:
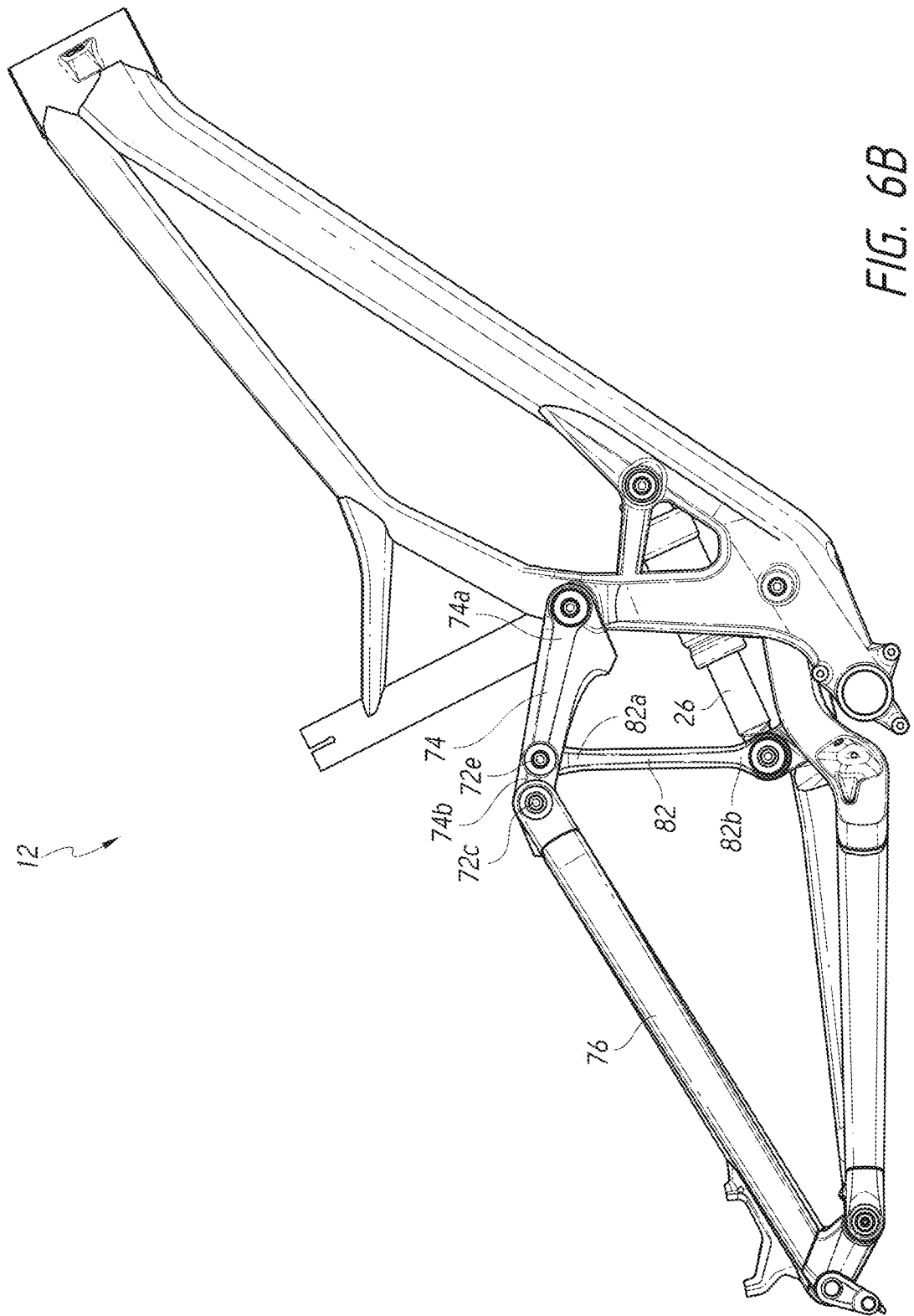

Although this embodiment shows the shock support assembly 80 having three pivot axes 72a, 75b, and 72c each having at least three members coupled for rotation thereabout, other embodiments may utilize different arrangements. For example, the first end 82a of the upper shock link 82 may be pivotally coupled only to the link member 74 or only to the seat stay 76 at a pivot axis different than axis 72c. One example of such an embodiment is shown in FIG. 6B. FIG. 6B illustrates an assembly comprising a frame 12 and shock absorber 26 that is similar to the embodiment illustrated in FIG. 2, except for the first end 82a of the upper shock link 82 being pivotally coupled to the link member 74 at pivot axis 72e. In another alternative embodiment, pivot axis 72e may be positioned on the seat stay 76, instead of the link member 74.

As another example, the first end 84a of the lower shock link 84 may be pivotally coupled to the lower arm 70 or the main frame 14 at a pivot axis different than pivot axis 72a. One example of such an embodiment is shown in FIG. 6C. FIG. 6C illustrates an assembly similar to the embodiment illustrated in FIG. 2, except for the first end 84a of the lower shock link 84 being pivotally coupled to the bottom bracket support member 56 at pivot axis 72e instead of pivot axis 72a. A portion of the lower arm 70 is hidden in FIG. 6C for clarity.

As another example, the front end 26a of the shock absorber 26 may be pivotally supported at a pivot axis shared by one or more other members. One example of such an embodiment is shown in FIG. 6A. FIG. 6A illustrates an assembly similar to the embodiment illustrated in FIG. 2, except for the front end 26a of the shock absorber 26 being pivotally coupled to the bottom bracket support member 56 and link member 74 at pivot axis 72b. Further, the embodiment of FIG. 6A desirably no longer includes the bracket 57 or gusset 58 (see FIG. 2), because the shock absorber 26 is no longer pivotally coupled to the down tube 54.

As further described below, it can be beneficial to utilize a design that comprises one or more pivot axes that have more than two members coupled thereto. Stated another way, it can be beneficial to have one or more pivot axes that is shared by at least three members.

Returning to FIGS. 1-5, advantageously, the illustrated shock support assembly 80 positions the rearward end 26b of the shock absorber 26 at a relative position configured to accommodate the rear wheel 24 without requiring an increase in the overall length of the frame. Preferably, the pivot axis 75b of the rearward end 26a of the shock absorber 26 is spaced from the rear hub axis $A_H$ a radial distance of at least about 26 inches in order to accommodate a rear wheel 24 of a typical diameter. However, the positioning of the pivot axis 75b may also be configured to accept larger wheels.

In one typical prior art arrangement, a shock absorber is situated in a substantially vertical orientation in front of a seat tube. However, in the presently illustrated arrangement, the rearward end 26b of the shock absorber is positioned relatively lower than the forward end 26a of the shock absorber, with the forward end 26a being positioned below the seat tube 60. Furthermore, the rearward end 26b of the shock absorber 26 is supported by the shock support assembly 80 at a position below the link member 74. Thus, the shock absorber 26 is mounted at a significantly lower position within the bicycle frame 12 than in the prior art arrangements. Accordingly, the illustrated arrangement provides a significantly lower center of gravity of the bicycle frame 12 than prior art arrangements, which improves handling characteristics of the associated bicycle 10. Preferably, in the relaxed configuration (shown in FIG. 2), pivot axis 75b is positioned at least 5 inches below pivot axis 72b. In some embodiments, in the relaxed configuration, pivot axis 75b is positioned 3-8, 4-7, or 5-6 inches below pivot axis 72b. Preferably, pivot axis 75a is positioned at least 2 inches below pivot axis 72b. In some embodiments, pivot axis 75a is positioned 0-5, 1-4, or 1.5-3 inches below pivot axis 72b.

As described above, the rearward end 26b of the shock absorber 26 is positioned relatively lower than the forward end 26a. Thus, the pivot axis 75b is positioned relatively lower than the pivot axis 75a. Thus, a longitudinal axis of the shock absorber 26 is canted in a downward direction when moving from the forward end 26a toward the rearward end 26b of the shock absorber 26. In addition, preferably, the pivot axis 75a and the pivot axis 75b straddle the crank axis $A_C$. That is, the forward end 26a and forward pivot axis 75a of the shock absorber 26 are positioned forward of the crank axis $A_C$ while the rearward end 26b and rearward pivot axis 75b of the shock absorber 26 are positioned rearward of the crank axis $A_C$. Preferably, the forward pivot axis 75a of the shock absorber 26 is positioned between about 4 and 12 inches forward of the crank axis $A_C$ and, more preferably, between about 5 and 7 inches forward of the crank axis $A_C$. Preferably, the rearward pivot axis 75b of the shock absorber 26 is positioned, in the relaxed configuration shown in FIG. 2, between about 1 and 3 inches rearward of the crank axis $A_C$.

Accordingly, with such a construction, a relatively long shock absorber 26 may be accommodated in a relatively low position without resulting in a lengthening of the bicycle frame 12. In a long travel bicycle frame, it is desirable to provide a shock absorber of a relatively increased length in order to retain a desirable ratio between movement of the rear wheel and corresponding movement (i.e., compression or rebound movement) of the shock absorber. If the ratio of wheel movement to shock absorber movement is increased, the force transmitted to the shock absorber is increased, which may be offset by higher spring and damping rates of the shock absorber. The higher spring and damping rates result in a reduction in the ride characteristics of the shock absorber, however. Thus, the illustrated rear suspension assembly is capable of accommodating a suitably-sized shock absorber 26 in order to maintain a desirable ratio between movement of the rear wheel 24 and movement of the shock absorber 26.

One benefit of the design illustrated in FIGS. 1-5 is that the rear axle path through the suspension travel can be more vertical and less of a forward arc than prior art designs. Many prior art designs for rear suspension systems cause the rear axle path to follow a forward arcing curve, with the forward arc being most pronounced at the end of the travel. The designs disclosed herein, however, can allow the rear axle path (i.e. the path of hub axis $A_H$) to remain more vertical, especially at the end of the stroke. This can improve bump absorption, because the wheel will tend to move more in the direction that bumps are encountered.

One feature of the designs disclosed herein that enables the rear wheel axle path to remain more vertical (or to follow an at least partially curved or arc-shaped path having a larger radius than prior art designs) is that the pivot axis 72a about which the chain stay or lower arm 70 pivots is desirably positioned in front of the crank axis $A_C$. By positioning the pivot axis 72a in front of the crank axis $A_C$, a longer distance between the pivot axis 72a and the hub axis $A_H$ and pivot axis 72d can be achieved. Further, in some embodiments, the pivot axis 72a is the forward-most pivot axis of the subframe 16, meaning pivot axis 72a is positioned forward of pivot axes 72b, 72c, and 72d. In this embodiment, the forward pivot axis 75a of the shock absorber 26 is positioned forward of the pivot axis 72a; however, in other embodiments, even the forward pivot axis of the shock absorber 26 may be positioned rearward of the pivot axis 72a (such as is shown in FIG. 6A). In the present embodiment, the pivot axis 72a is positioned approximately 0.63 inches forward of the pivot axis 72b, which is the nearest pivot axis in a horizontal direction. Desirably, the pivot axis 72a can be positioned at least 0.10, 0.25, 0.50, 0.75, 1.00, 1.25, 1.50, 1.75, or 2.00 inches forward of the pivot axis 72b. In some embodiments, the pivot axis 72a is positioned 0.00-2.00, 0.10-1.50, or 0.25-1.00 inches forward of the pivot axis 72b. In some embodiments, however, the pivot axis 72b may be in line with the pivot axis 72b (in a horizontal direction), or may be behind the pivot axis 72b.

Desirably, the pivot axis 72a is positioned at least 3 inches forward of the crank axis $A_C$. In some embodiments, the pivot axis 72a is positioned at least 1, 1.5, 2, 2.5, 3.5, 4, 4.5, or 5 inches forward of the crank axis $A_C$. In some embodiments, the pivot axis 72a is positioned 1-5 or 2-4 inches forward of the crank axis $A_C$. Desirably, a horizontal distance between the pivot axis 72a and the hub axis $A_H$ is at least 18 inches when the subframe 16 is in the relaxed configuration. In some embodiments, the horizontal distance between the pivot axis 72a and the hub axis $A_H$ is at least 20 inches when the subframe 16 is in the relaxed configuration. In some embodiments, the horizontal distance between the pivot axis 72a and the hub axis $A_H$ is within a range of 17-23, 18-22, or 19-21 inches when the subframe 16 is in the relaxed configuration. A ratio can also be used to describe a relative difference between (1) the horizontal distance between the crank axis $A_C$ and the pivot axis 72a and (2) the horizontal distance between the hub axis $A_H$ and the pivot axis 72a. For example, in some embodiments, the horizontal distance from the hub axis $A_H$ to the pivot axis 72a is no greater than 10 times the horizontal distance from the crank axis $A_C$ to the pivot axis 72a when the subframe 16 is in the relaxed configuration. In some embodiments, the horizontal distance from the hub axis $A_H$ to the pivot axis 72a is no greater than five, six, seven, eight, or nine times the horizontal distance from the crank axis $A_C$ to a pivot axis 72a when the subframe 16 is in the relaxed configuration. In some embodiments, the horizontal distance from the hub axis $A_H$ to the pivot axis 72a is within a range of 5-8 or 6-9 times the horizontal distance from the crank axis $A_C$ to a pivot axis 72a when the subframe 16 is in the relaxed configuration.

Another benefit of the designs disclosed herein is that the linkage arrangement of the subframe 16 can enable a more progressive leverage ratio than prior art designs. As of the subframe 16 is compressed or moves from the relaxed configuration to the compressed configuration, the pivot axis 72c will be caused to move up and forward. This will cause the upper shock link 82 and its pivot connection 75b with shock absorber 26 to also move up and forward. As this occurs, however, the first end or upper end 82*a* of the upper shock link 82 will move forward less than the second or lower end 82*b* of the shock link 82 (rotating the upper shock link 82 in a counterclockwise direction as viewed in FIG. 2). Stated another way, an angle between two lines drawn through the pivot axes of the upper and lower shock links 82, 84 (shown as angle A in FIG. 3) will tend to increase as the suspension in compressed. One reason for this is because the distance between pivot axes 72*c* and 72*b* is desirably longer than the distance between pivot axes 75*b* and 72*a*. Such a configuration will tend to decrease the leverage provided by the shock support assembly 80 as the suspension is compressed. Accordingly, as the suspension nears the end of its travel, the suspension will effectively become progressively stiffer, reducing the likelihood of a harsh bottoming out. Desirably, the lengths and positioning of the upper shock link 82 and lower shock link 84 are configured such that the three corresponding pivot axes 72*c*, 75*b*, and 72*a* are never coplanar throughout the suspension travel from the relaxed configuration to the compressed configuration. Stated another way, if a line is drawn normal to and between pivot axes 72*a* and 72*c*, it is desirable for pivot axis 75*b* to always remain rearward of that line throughout the stroke of the suspension travel. In some embodiments, the compressed configuration is defined as a configuration in which the suspension assembly is compressed to a point that one or more stop surfaces are engaged, that mechanically resist further compression of the suspension assembly. Such stop surfaces may be part of the shock absorber 26 and/or the subframe 16. In some embodiments, the pivot axes 72*c*, 75*b*, and 72*a* may be configured to become coplanar at or near the end of the stroke of the suspension travel.

Another benefit of the designs disclosed herein relates to the sharing of pivot axes. For example, in the embodiment illustrated in FIGS. 1-5, the subframe 16 and shock absorber 26 assembly comprise a total of six pivot axes, with three of those six pivot axes being shared by more than two members. Specifically, in this embodiment, pivot axis 72*a* is shared by three members (the main frame 14, the lower arm 70, and the lower shock link 84), pivot axis 72*c* is shared by three members (link member 74, upper arm 76, and upper shock link 82), and pivot axis 75*b* is shared by three members (upper shock link 82, lower shock link 84, and shock absorber 26). In other embodiments, more or fewer pivot axes may be shared by more than two members, and/or a different combination of pivot axes may be shared. For example, in some embodiments, the first end 26*a* of the shock absorber 26 may be pivotally supported at pivot axis 72*b* (as shown in FIG. 6A), thus leading to pivot axis 72*b* being shared by three members (main frame 14, link member 74, and shock absorber 26). If such a design is incorporated into the embodiment of FIGS. 1-5, the subframe 16 and shock absorber 26 assembly would then comprise four shared pivot axes. Such a design may raise the center of gravity of the bicycle as compared to the embodiment shown in FIGS. 1-5, but may also have benefits, such as reduced overall weight, easier and/or cheaper manufacturability, and/or the like. In some embodiments, the pivot axis 72*b* may be lower than the design shown in FIGS. 1-5, and thus moving the first end 26*a* of the shock absorber to share pivot axis 72*b* may not raise the center of gravity as compared to the embodiment shown in FIGS. 1-5 (or may not raise the center of gravity as much as if the pivot axis 72*b* were not lowered). FIGS. 6B and 6C, discussed above, illustrate example embodiments having two shared pivot axes, instead of three shared pivot axes.

Sharing of pivot axes by more than two members can have multiple benefits. For example, each pivot axis requires at least some associated hardware, such as bolts, axles, bearings, bushings, and/or the like. By sharing a pivot axis with three or more members, the associated hardware requirements may be reduced, thus reducing weight and/or cost, and potentially increasing manufacturability. For example, in some embodiments, a shared pivot axis may comprise a single axle having a plurality of bearings coupled thereto (for example, at least one bearing per member that is pivotally coupled to the axle). In some embodiments, the axle may be affixed to and/or formed as a part of one of the members forming that shared pivot axis.

Sharing of pivot axes may also lead to another benefit related to increased manufacturability and/or reduced manufacturing costs. To have an articulating suspension assembly operate effectively, certain tolerances need to be met. Examples of such tolerances are the tolerance in spacing between pivot axes, and the tolerance in parallel alignment of the pivot axes. The more pivot axes there are, the more important tolerance stackups can become, potentially leading to more variation in location and/or alignment of the various pivot axes to one another. Accordingly, as the number of pivot axes increases, more precise and/or expensive methods of manufacturing may be required to maintain those characteristics within design tolerance limits. By sharing pivot axes with multiple members, however, the overall number of pivot axes required in the design can be reduced, and some of the tolerance stackup associated with additional pivot axes may be eliminated.

Preferably, the pivot axes 72*a* and 72*b* are both defined by the bottom bracket support member 56. As described above, desirably the bottom bracket support member 56 is constructed of a monolithic, forged piece of material. Accordingly, the bottom bracket support member 56 may take on a more complex structure than the typical welded together tubes of a conventional bicycle frame. Advantageously, the monolithic bottom bracket support member 56 can be configured to handle the specific loads placed on the main frame 14 by the subframe 16 with a minimum of material, thereby resulting in a lower overall weight of the bicycle frame 12. Further, the first end 26*a* of the shock absorber 26 can be supported by bracket 57 and/or gusset 58, each of which may be attached to or formed as part of the bottom bracket support member 56. Due to the high strength of the bottom bracket support member 56, the seat tube 60 and top tube 52 do not have to support the loads placed on the main frame 14 by the subframe 16 and, therefore, can be lighter in weight. Further, with bracket 57 and/or gusset 58 attached to or formed as part of the bottom bracket support member 56, the down tube 54 does not have to support the entire load applied by the shock absorber 26 to the bracket 57.

Another benefit of designs disclosed herein is that the rear wheel path and the shock absorber leverage ratio can be at least partially independent from one another, and thus both optimized. Preferably, the seat stay member 76 supports the rear wheel 24 (shown in FIG. 1) for rotation about hub axis $A_H$ and, preferably, the hub axis $A_H$ is positioned above the pivot axis 72*d* defined by the lower end 76*b* of the seat stay member 76 and the rearward end 70*b* of the chain stay member 70. Accordingly, the suspension path of the hub axis $A_H$ is determined primarily by the relative lengths and angles of the link member 74, seat stay member 76, and chain stay 70. Desirably, the hub axis $A_H$ moves through a generally vertical wheel path in order to inhibit pedal forces or braking forces from influencing movement of the rear wheel 24 throughout the suspension travel path. However, in alternative arrangements, the hub axis $A_H$ may move through a more complex, curvilinear wheel path. As described above, the illustrated bicycle frame 12 is well adapted to provide a relatively large amount of rear wheel 24 suspension travel. Preferably, the frame 12 provides at least about 6 inches of vertical movement of the hub axis $A_H$ relative to the main frame 14 and, more specifically, relative to the surface S upon which the bicycle 10 is being ridden. More preferably, the hub axis $A_H$ is configured for at least about 8 inches of vertical movement. As will be readily appreciated by one of skill in the art, the movement of the hub axis $A_H$ is dependent on the overall position of the bicycle 10 and, therefore, may not necessarily be vertical. Herein, the term "vertical" is used in reference to the position of the bicycle 10 illustrated in FIG. 1. The "vertical" movement of the hub axis $A_H$ may also be described as movement substantially normal to the surface S.

Furthermore, in the illustrated bicycle frame 12, the rear shock absorber 26 is actuated by the shock support assembly 80, including upper and lower shock links 82, 84. Thus, with the preferred arrangement illustrated herein, leverage ratio on the shock absorber 26 is determined primarily by the shock support assembly 80, while the wheel path is primarily determined by the link member 74, seat stay 76, and chain stay 70. Accordingly, each of the leverage ratio and the wheel path characteristics may be optimized.

Figure 6D:
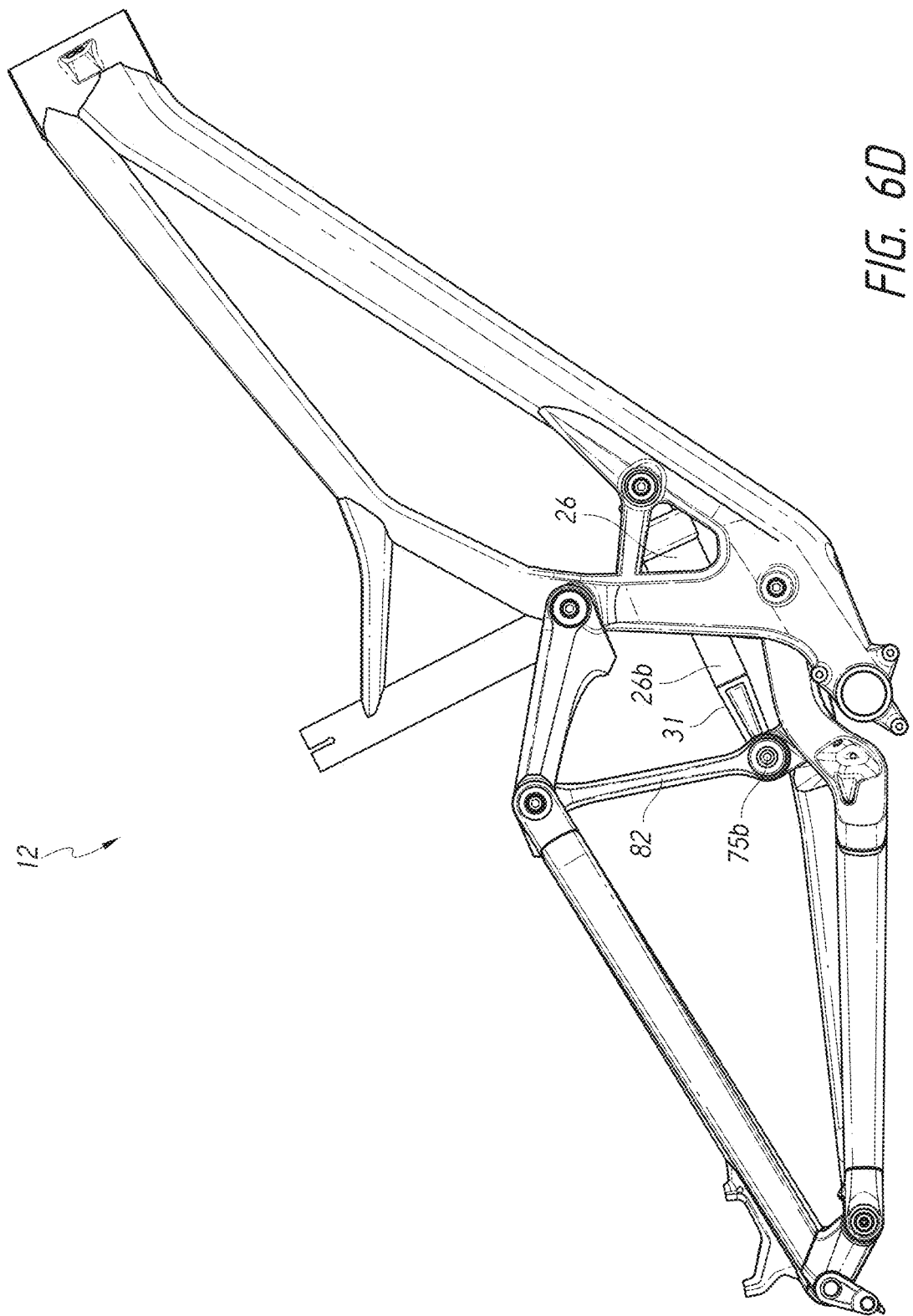

In some embodiments, configuration of the shock support assembly 80 and shock absorber 26 may be further optimized by adding a shock extension to the rear end 26b of the shock absorber. An example of such an embodiment is shown in FIG. 6D. FIG. 6D shows an example suspension assembly similar to the suspension assembly shown in FIG. 2, except that a shock extension 31 is attached to the rear end 26b of the shock absorber 26. The shock extension 31 may comprise, for example, a first end connected to a portion of the rear end 26b of the shock absorber 26, and a second end comprising a pair of extension arms pivotally supported at pivot axis 75b. Using a shock extension 31 can have various benefits, such as changing the shock leverage ratio, avoiding interference with the rear wheel or seat post, and/or the like.

With reference to FIG. 2, in the relaxed configuration of the suspension, pivot axis 72b is preferably above and behind pivot axis 72a. Pivot axis 72c is preferably also above and behind pivot axis 72b. Pivot axis 72d is preferably below and behind pivot axes 72a, 72b, and 72c. Pivot axis 75a is preferably forward of pivot axes 72a and 72b, below pivot axis 72b, and above pivot axis 72a. Pivot axis 75b is preferably rearward of pivot axes 72a and 72b, forward of pivot axes 72c and 72d, below pivot axes 72b and 72c, and above pivot axes 72a and 72d. Various other embodiments may position one or more of these pivot axes differently; however, the present arrangement of pivot axes has been found to advantageously isolate pedal induced and brake induced forces from being transmitted to the rear suspension of the bicycle 10, while also allowing for a more vertical rear wheel travel and a more progressive leverage ratio. As such, these relative pivot locations are preferred locations.

Alternatively, other relative pivot locations may be used. For example, pivot axis 72b may be forward of pivot axis 72a, pivot axis 75b may be below pivot axis 72a, pivot axis 75b may be rearward of pivot axis 72c, and/or the like. In addition, other modifications apparent to one of skill in the art may also be incorporated.

Desirably, one or more bearing assemblies are provided at each pivot 72, 75 to permit smooth pivoting motion of the rear suspension. Alternatively, bushings or other suitable constructions may also be used, as may be determined by one of skill in the art.

Preferably, the shock absorber 26 is mounted to the bicycle frame 12 such that a main body portion of the shock absorber 26 is positioned substantially within a perimeter defined in a generally vertical plane by the lower shock link 84, upper shock link 82, link member 74, a line drawn between pivot axes 72b and 75a, and a portion of the main frame 14 between pivot axes 75a and 72a. With such an arrangement, the shock absorber 26 advantageously lowers the center of gravity of the bicycle 10 and is protected from damage by the lower arm 70, link member 74, down tube 54, and bottom bracket support member 56. In some embodiments, the shock absorber may comprise a reservoir portion, which may also be positioned within the above-described perimeter, or may be positioned at least partially outside of the above-described perimeter.

Figure 7:
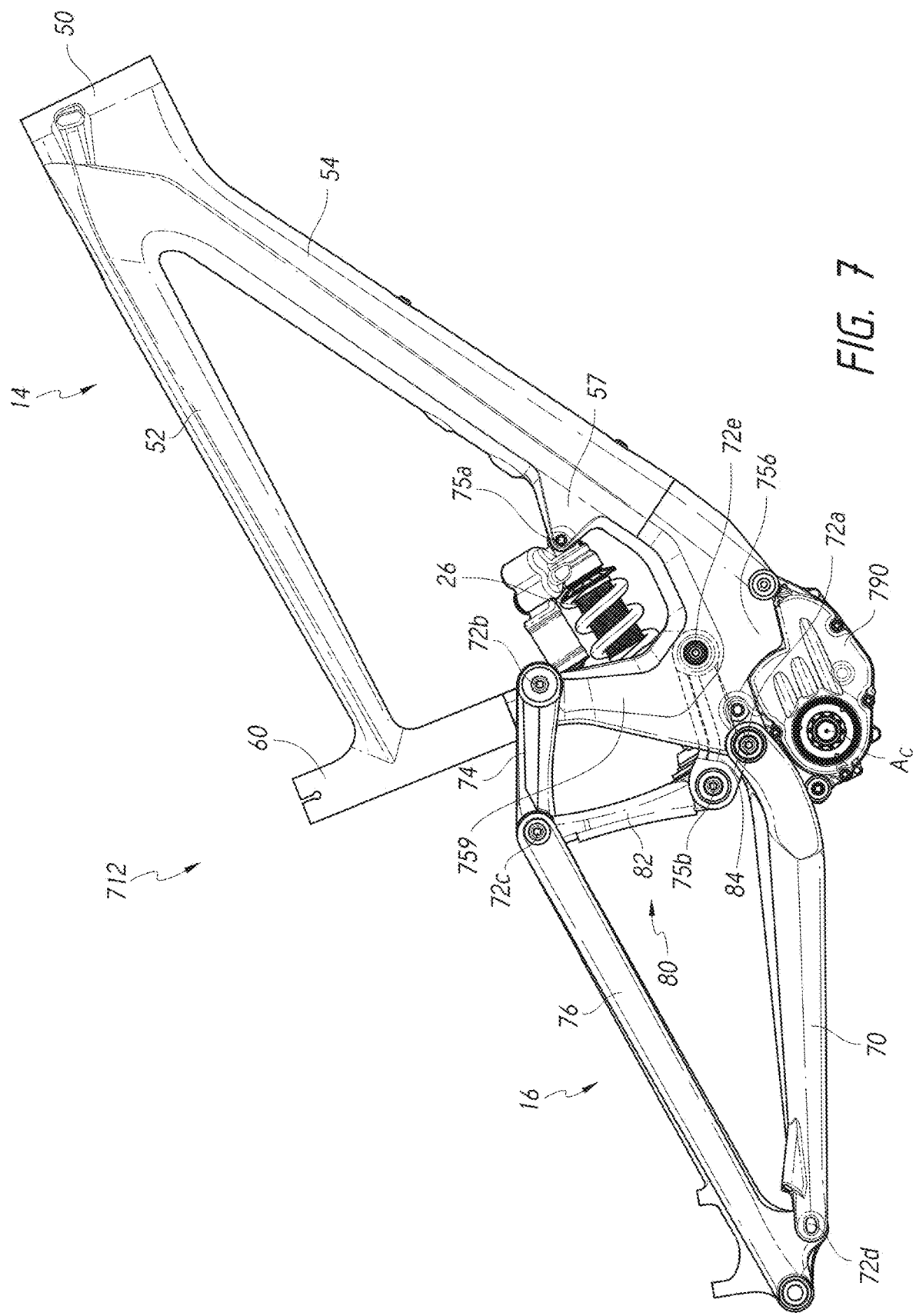
FIG. 7 is a side elevational view of another embodiment of a bicycle frame.

FIG. 7 illustrates another embodiment of a bicycle frame 712 comprising a suspension assembly. The bicycle frame 712 comprises a variety of similarities to other bicycle frames disclosed herein, and similar reference numbers are utilized to refer to similar features. Accordingly, for brevity, the following description focuses on differences from the other bicycle frames disclosed herein. Unless otherwise stated, any of the features, benefits, and alternative arrangements discussed above can apply to the embodiment of FIG. 7, and to alternatives thereof.

One difference in bicycle frame 712 is that bicycle frame 712 is intended to be used in an electric bicycle. Accordingly, the main frame portion 14 comprises a differently shaped bottom bracket support member 756 that has a motor housing 790 connected thereto. An electric motor is desirably positioned within a cavity created by the bottom bracket support member 756 and motor housing 790, with the motor desirably positioned adjacent the crank axis $A_C$. In some embodiments, the motor is positioned within the cavity created by the bottom bracket support member 756 and motor housing 790, and the crank axis $A_C$ passes through the motor housing 790. In some embodiments, the crank axis $A_C$ passes through the motor and/or passes through a gearbox that is coupled to the motor. In some embodiments, the motor is coupled to the motor housing 790 and the crank axis $A_C$ passes through the motor housing 790. In some embodiments, the motor is positioned within one, two, three, four, five, or six inches of the crank axis $A_C$. In some embodiments, the motor is positioned with respect to the frame 712 in a mid-drive arrangement. In some embodiments, the bicycle frame 712 can be used in a pedal assist electric bicycle, wherein the motor positioned within the cavity created by the bottom bracket support member 756 and motor housing 790 is configured to work in cooperation with a pedal input torque provided by the rider at the crank axis $A_C$ (for example, using a pedal crank assembly, which may be similar to pedal crank assembly 32 of FIG. 1).

In the embodiment of FIG. 7, some of the pivot axes have been repositioned with respect to the other embodiments disclosed herein, for example, to be positioned in locations that have benefits in an electric bicycle application. For example, the lower arm pivot axis 72a and the lower shock link pivot axis 72e are both positioned above the motor housing 790 and near an upper portion of the bottom bracket support member 756. For clarity, a portion of the lower shock link 84 that is hidden by the bottom bracket support member 756 and lower arm 70 is shown in phantom lines in FIG. 7. Such an arrangement can, for example, allow for more space to position the motor within the cavity created by the bottom bracket support member 756 and motor housing 790. Further, the relative horizontal and vertical positions of the various pivot axes have been positioned to allow the suspension system to exhibit desirable shock absorbing characteristics while accounting for the added weight and different dynamics of a bicycle frame that includes a motor (and potentially other components such as a gearbox, controller, and/or the like) positioned within, adjacent, and/or below the bottom bracket support member 756, and that may include one or more batteries positioned within the frame, such as within the down tube 54.

One difference in pivot axes positions is that, similar to the alternative embodiment shown in FIG. 6C, the lower arm 70 and lower shock link 84 do not share a pivot. Unlike the embodiment of FIG. 6C, however, in this embodiment, the lower shock link pivot axis 72e is positioned forward of the lower arm pivot axis 72a. Moving the pivot axis 72a rearward may, for example, help to provide more desirable suspension characteristics with a heavier bottom bracket area of the frame. In this embodiment, the crank axis $A_C$ is also positioned horizontally between the pivot axes 72a and 72e, which may, for example, help to provide more desirable suspension characteristics with a heavier bottom bracket area of the frame. In other embodiments, the crank axis $A_C$ may be positioned in line with or behind pivot axis 72a.

Another difference in the bicycle frame 712 is that the lever arm 74 is connected to the main frame portion 14 at pivot axis 72b that is positioned horizontally between pivot axes 72a and 72e. Further, the lower shock link pivot axis 72e is, in this embodiment, positioned in the bottom bracket support member 756. Positioning the lower shock link pivot axis 72e in the bottom bracket support member 756, may, for example, allow the seat tube support member 759 to extend rearward from the bottom of the seat tube 60 to the bottom bracket support member 756, while still allowing the lower shock link 84 to have sufficient length to exhibit desirable suspension characteristics. In some embodiments, it may be desirable for the seat tube support member 759, when viewed in a side elevational view as shown in FIG. 7, to extend from the bottom of the seat tube 60 in a direction that coincides with the crank axis $A_C$. Stated another way, as viewed in the orientation shown in FIG. 7, if a forward surface of the seat tube support member 759 defines a first plane that is perpendicular to the sheet, and a rearward surface of the seat tube support member 759 defines a second plane that is perpendicular to the sheet, the crank axis $A_C$ is desirably positioned between the first plane and the second plane. Such a configuration can, for example, lead to less stress in the main frame portion 14 while a rider is cranking the pedals.

In the embodiment illustrated in FIG. 7, a horizontal distance between the lower arm pivot axis 72a and lever arm pivot axis 72b is desirably at least twice a horizontal distance between the lever arm pivot axis 72b and the lower shock link pivot axis 72e. In some embodiments, it can be desirable for this ratio to be at least or approximately 3.0, 2.5, 2.0, 1.5, or 1.0.

Another difference in the bicycle frame 712 of FIG. 7 is that the bracket 57 of the downtube 54 extends further rearward of the main body portion of the downtube 54. For example, the bracket 57 extends rearward sufficiently such that the pivot axis 75a is completely behind the main body portion of the downtube 54. Stated another way, as viewed in the orientation shown in FIG. 7, if a rearward surface of the downtube 54 defines a plane that is perpendicular to the sheet, the pivot axis 75a is desirably positioned rearward of the plane. Further, in some embodiments, the pivot axis 75a is poisoned sufficiently rearward of the main body portion of the downtube 54 so that all features that define the pivot axis 75a (such as bearings, bushings, eyelets, and/or the like) are also positioned rearward of the main body portion of the downtube 54. Such arrangements may be desirable in an electric bicycle design, for example, because it may be desirable to maximize space within a cavity of the downtube 54, to allow for positioning of one or more batteries and/or other components therein.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, as further discussed above, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

In describing the present technology, the following terminology may have been used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle, comprising:
   a front wheel;
   a rear wheel;
   a frame comprising a main frame portion and an articulating frame portion, said articulating frame portion carrying said rear wheel, said articulating frame portion having a relaxed configuration and a compressed configuration;
   the articulating frame portion comprising:
      a lower arm pivotally supported at a first axis by the main frame portion;
      an upper frame link pivotally supported at a second axis by the main frame portion;
      an upper arm pivotally coupled to the upper frame link and the lower arm;
      an upper shock link pivotally supported at a third axis by one or both of the upper frame link and the upper arm; and
      a lower shock link pivotally coupled to the main frame portion; and
   a shock absorber having a first end and a second end, the first end pivotally supported at a fourth axis by the main frame portion, the second end pivotally supported at a fifth axis by the upper shock link and the lower shock link, the shock absorber configured to bias the articulating frame portion to the relaxed configuration;
   wherein the first axis is positioned forward of the second axis when the bicycle is positioned on a horizontal surface with the articulating frame portion in the relaxed configuration; and
   wherein the fourth axis is positioned above the fifth axis when the bicycle is positioned on a horizontal surface with the articulating frame portion in the relaxed configuration, such that the shock absorber is positioned sloping downward from front to back.

2. The bicycle of claim 1, wherein the first axis is positioned at least 0.50 inches forward of the second axis when the bicycle is positioned on a horizontal surface with the articulating frame portion in the relaxed configuration.

3. The bicycle of claim 1, wherein the upper shock link is pivotally supported at the third axis by both of the upper frame link and the upper arm.

4. The bicycle of claim 1, wherein the rear wheel is rotatably coupled to the upper arm.

5. The bicycle of claim 1, wherein the lower shock link is pivotally coupled to the main frame portion at a sixth axis, and
   the upper and lower shock links are positioned such that the third axis, fifth axis, and sixth axis are never coplanar throughout a range of motion of the articulating frame portion from the relaxed configuration to the compressed configuration.

6. The bicycle of claim 5, wherein the sixth axis is collinear with the first axis.

7. The bicycle of claim 1, wherein the second axis is collinear with the fourth axis.

8. The bicycle of claim 1, wherein the fourth axis is positioned above the fifth axis in all positions between the compressed configuration and the relaxed configuration when the bicycle is positioned on a horizontal surface.

9. The bicycle of claim 1, wherein the fourth axis is positioned below the second axis.

10. The bicycle of claim 1, wherein the fourth axis and the fifth axis are both positioned below the second axis throughout a range of motion of the articulating frame portion from the relaxed configuration to the compressed configuration.

11. The bicycle of claim 1, wherein the second end of the shock absorber comprises a shock extension pivotally supported at the fifth axis by the upper shock link and the lower shock link.

* * * * *